US012621110B2

(12) United States Patent
Lin et al.

(10) Patent No.: US 12,621,110 B2
(45) Date of Patent: May 5, 2026

(54) METHODS OF LATENCY REDUCTION FOR POSITIONING-SPECIFIC MEASUREMENT REPORTING

(71) Applicant: MEDIATEK INC., Hsinchu City (TW)

(72) Inventors: Guan-Yu Lin, Hsinchu City (TW); Chiao-Yao Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 387 days.

(21) Appl. No.: 18/248,911

(22) PCT Filed: Oct. 14, 2021

(86) PCT No.: PCT/CN2021/123756
§ 371 (c)(1),
(2) Date: Apr. 13, 2023

(87) PCT Pub. No.: WO2022/078430
PCT Pub. Date: Apr. 21, 2022

(65) Prior Publication Data
US 2023/0388085 A1 Nov. 30, 2023

Related U.S. Application Data

(60) Provisional application No. 63/092,533, filed on Oct. 16, 2020.

(51) Int. Cl.
*H04L 5/00* (2006.01)
*H04W 64/00* (2009.01)

(52) U.S. Cl.
CPC .......... *H04L 5/0057* (2013.01); *H04L 5/0048* (2013.01); *H04W 64/003* (2013.01)

(58) Field of Classification Search
CPC .. H04L 5/0057; H04L 5/0048; H04W 64/003; H04W 24/10; H04W 64/00;
(Continued)

(56) References Cited

U.S. PATENT DOCUMENTS

2018/0199334 A1* 7/2018 Ying ...................... H04W 48/12
2018/0352481 A1* 12/2018 Taguchi ................ H04W 72/04
(Continued)

FOREIGN PATENT DOCUMENTS

CA        3036351 C * 8/2022 ............ H04W 72/02
CN      108353332 A * 7/2018 ............ H04W 72/21
(Continued)

OTHER PUBLICATIONS

R. Keating, M. Saily, J. Hulkkonen and J. Karjalainen, "Overview of Positioning in 5G New Radio," 2019 16th International Symposium on Wireless Communication Systems (ISWCS), Oulu, Finland, 2019, pp. 320-324 (Year: 2019).*
(Continued)

*Primary Examiner* — Ayaz R Sheikh
*Assistant Examiner* — Louis Samara
(74) *Attorney, Agent, or Firm* — McClure, Qualey & Rodack, LLP

(57) ABSTRACT

A method of latency reduction for positioning-specific measurement reporting is provided. A User Equipment (UE) performs first measurements on Positioning Reference Signals (PRSs) to obtain first measurement results in response to receiving a location information request from a mobile communication network. The UE uses a first configured grant to transmit a first measurement report including the first measurement results to the mobile communication network. The UE performs second measurements on PRSs to obtain second measurement results in response to the same location information request. The UE uses the first configured grant to transmit a second measurement report including the second measurement results to the mobile communication network, without triggering a Scheduling Request (SR) procedure or a Buffer Status Report (BSR) procedure.

18 Claims, 12 Drawing Sheets

(58) Field of Classification Search

CPC ............. H04W 72/04; H04W 28/0278; H04W 68/005; G01S 5/10

See application file for complete search history.

(56) References Cited

U.S. PATENT DOCUMENTS

| | | | | |
|---|---|---|---|---|
| 2019/0327707 | A1* | 10/2019 | Agnihotri | G01S 5/10 |
| 2019/0364590 | A1* | 11/2019 | Sartori | H04W 72/20 |
| 2020/0128412 | A1* | 4/2020 | Kazmi | H04W 16/28 |
| 2020/0314940 | A1* | 10/2020 | Park | H04W 4/40 |
| 2021/0050963 | A1* | 2/2021 | Zarifi | H04W 24/10 |
| 2022/0046425 | A1* | 2/2022 | Edge | H04W 60/04 |
| 2022/0132463 | A1* | 4/2022 | Cha | H04B 17/27 |
| 2023/0388085 | A1* | 11/2023 | Lin | H04L 5/0057 |
| 2024/0064562 | A1* | 2/2024 | Yi | H04W 72/23 |

FOREIGN PATENT DOCUMENTS

| | | | | | |
|---|---|---|---|---|---|
| CN | 111417189 | A | 7/2020 | | |
| CN | 111656714 | A | 9/2020 | | |
| CN | 111757385 | A | 10/2020 | | |
| EP | 3122104 | B1 * | 3/2019 | ............ | H04W 24/10 |
| WO | 2014146530 | A1 | 9/2014 | | |
| WO | WO-2019209747 | A1 * | 10/2019 | .......... | G01S 5/0236 |
| WO | 2020093358 | A1 | 5/2020 | | |
| WO | 2020/143619 | A1 | 7/2020 | | |

OTHER PUBLICATIONS

Lin, m Xingqin, "A Primer on Bandwidth Parts in 5G New Radio" arXiv: 2004.00761[cs.NI], https://doi.org/10.48550/arXiv.2004. 00761 (Year: 2020).*

International Search Report and Written Opinion dated Jan. 7, 2022, issued in application No. PCT/CN2021/123756.

* cited by examiner

100

120

Core network 122

Access network 121

110

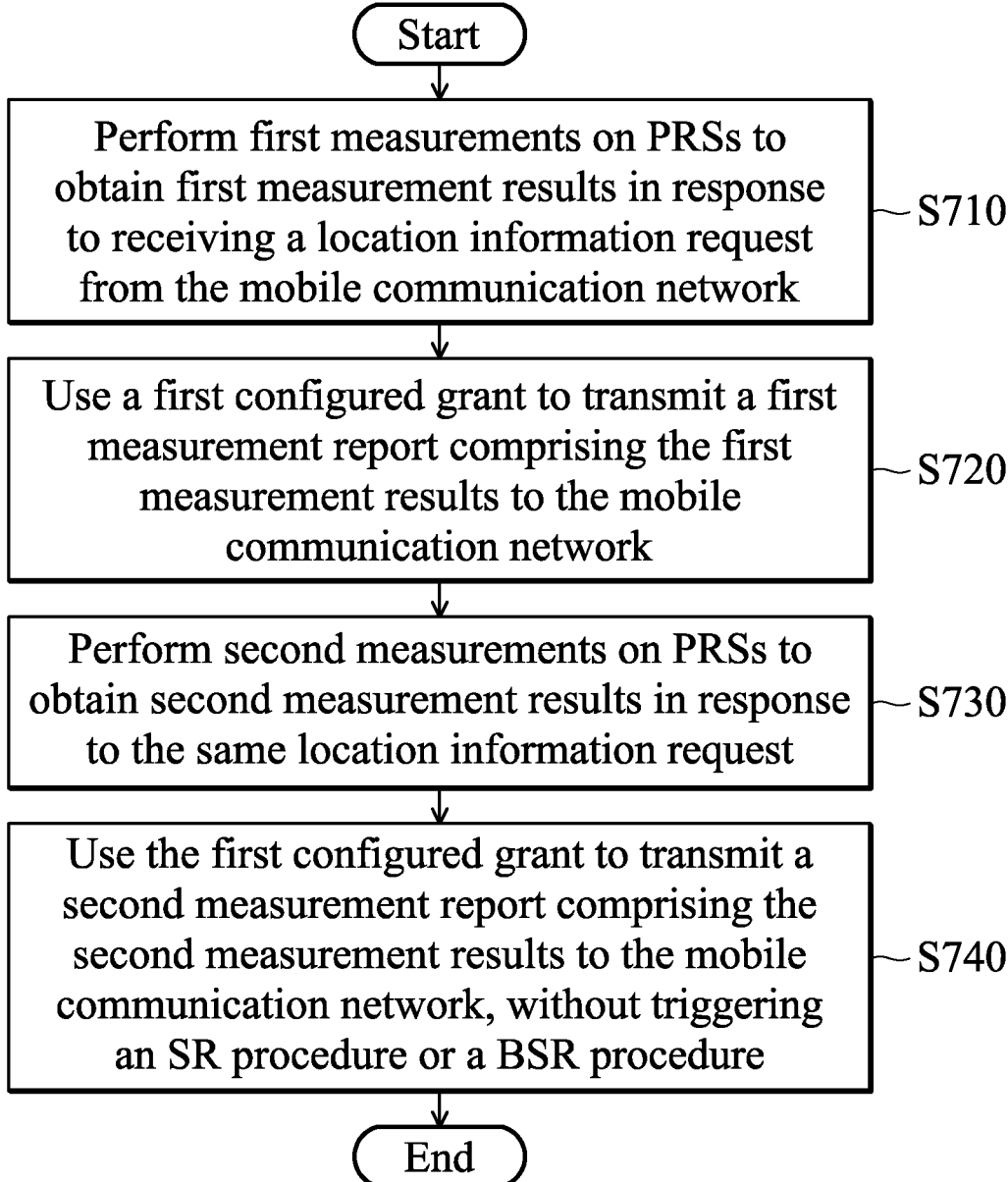

Start

Perform first measurements on PRSs to obtain first measurement results in response to receiving a location information request from the mobile communication network — S710

Use a first configured grant to transmit a first measurement report comprising the first measurement results to the mobile communication network — S720

Perform second measurements on PRSs to obtain second measurement results in response to the same location information request — S730

Use the first configured grant to transmit a second measurement report comprising the second measurement results to the mobile communication network, without triggering an SR procedure or a BSR procedure — S740

End

FIG. 7

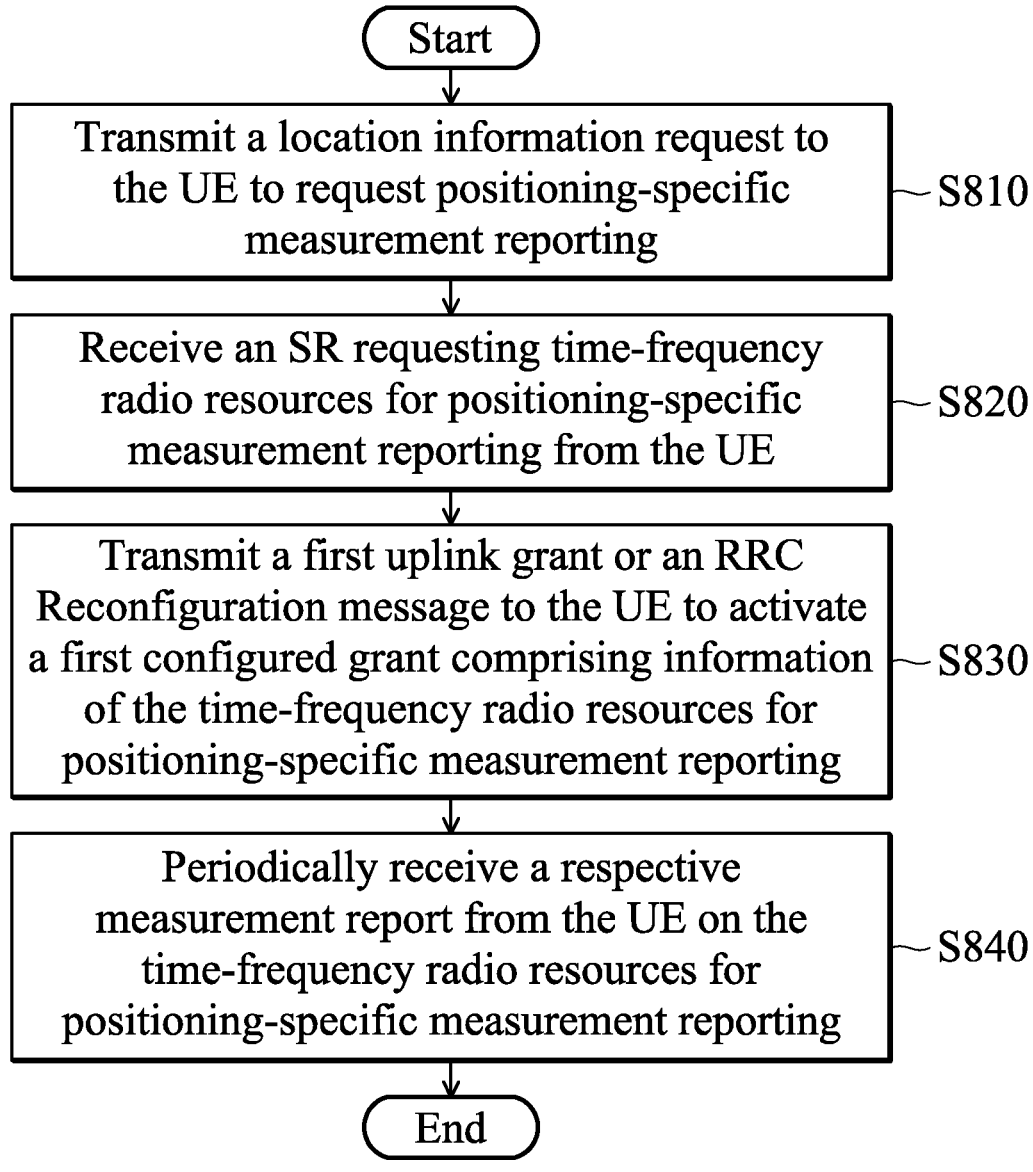

Start

Transmit a location information request to the UE to request positioning-specific measurement reporting ⟶ S810

Receive an SR requesting time-frequency radio resources for positioning-specific measurement reporting from the UE ⟶ S820

Transmit a first uplink grant or an RRC Reconfiguration message to the UE to activate a first configured grant comprising information of the time-frequency radio resources for positioning-specific measurement reporting ⟶ S830

Periodically receive a respective measurement report from the UE on the time-frequency radio resources for positioning-specific measurement reporting ⟶ S840

End

FIG. 8

METHODS OF LATENCY REDUCTION FOR POSITIONING-SPECIFIC MEASUREMENT REPORTING

CROSS REFERENCE TO RELATED PATENT APPLICATION

This application claims priority under 35 U.S.C. § 119 from U.S. Provisional Application No. 63/092,533, entitled "Latency reduction for measurement reports", filed on Oct. 16, 2020, the subject matter of which is incorporated herein by reference.

TECHNICAL FIELD

The application generally relates to mobile communications and, more particularly, to methods of latency reduction for positioning-specific measurement reporting.

BACKGROUND

In a typical mobile communication environment, a User Equipment (UE) (also called a Mobile Station (MS)), such as a mobile telephone (also known as a cellular or cell phone), or a tablet Personal Computer (PC) with wireless communication capability may communicate voice and/or data signals with one or more mobile communication networks. The wireless communication between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, and LTE-Advanced (LTE-A) technology, etc. In particular, GSM/GPRS/EDGE technology is also called 2G technology; WCDMA/CDMA-2000/TD-SCDMA technology is also called 3G technology; and LTE/LTE-A/TD-LTE technology is also called 4G technology.

These RAT technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In 5G network, the positioning procedure may involve a sequence of procedures, including the capability transfer procedure, the assistance data transfer procedure, and the location information transfer procedure. Generally, the capability transfer procedure may occur only once, while the assistance data transfer procedure and the location information transfer procedure may be performed more than once. In particular, the assistance data transfer procedure may be performed with a longer periodicity (i.e., the assistance data is updated with a longer period). On the other hand, the location information, including measurement results and measurement reference time, may be updated with a shorter period (i.e., the location information transfer procedure may be performed more frequently). However, before providing a measurement report to the network, a UE needs to perform a series of signaling exchanges with the network, including transmitting a scheduling request, receiving an uplink grant, transmitting a Buffer Status Report (BSR), and receiving a further uplink grant. As a result, the latency incurred by the signaling exchanges for each measurement reporting may take a toll on the performance of the positioning procedure. A solution is sought.

SUMMARY

In a first aspect of the application, a method executed by a User Equipment (UE) communicatively connected to a mobile communication network is provided. The method comprises the following steps: performing first measurements on Positioning Reference Signals (PRSs) to obtain first measurement results in response to receiving a location information request from the mobile communication network; using a first configured grant to transmit a first measurement report comprising the first measurement results to the mobile communication network; performing second measurements on PRSs to obtain second measurement results in response to the same location information request; and using the first configured grant to transmit a second measurement report comprising the second measurement results to the mobile communication network, without triggering a Scheduling Request (SR) procedure or a Buffer Status Report (BSR) procedure.

In a first implementation form of the first aspect of the application, the method further comprises the following steps: transmitting a Scheduling Request (SR) to the mobile communication network to request time-frequency radio resources for positioning-specific measurement reporting; and receiving a first uplink grant or a Radio Resource Control (RRC) Reconfiguration message activating the first configured grant comprising information of the time-frequency radio resources for positioning-specific measurement reporting.

In a second implementation form of the first aspect of the application in combination with the first implementation form of the first aspect of the application, the reception of the first uplink grant or the RRC Reconfiguration message is performed in response to the transmission of the SR, without triggering the BSR procedure, and the method further comprises: prior to receiving the location information request, transmitting an RRC message comprising information on a suggested grant size for positioning-specific measurement reporting.

In a third implementation form of the first aspect of the application in combination with the second implementation form of the first aspect of the application, the RRC message is a UE Assistance Information message.

In a fourth implementation form of the first aspect of the application in combination with the third implementation form of the first aspect of the application, the UE Assistance Information message is transmitted when a positioning service of the UE is activated or deactivated, or when a serving cell of the UE has changed and the UE has not transmitted any UE Assistance Information message to the new serving cell, or when a period of time has elapsed since a last transmitted UE Assistance Information message, or when the suggested grant size is different from that in the last transmitted UE Assistance Information message.

In a fifth implementation form of the first aspect of the application in combination with the first implementation form of the first aspect of the application, the method further comprises the following steps: receiving a second uplink grant for BSR transmission in response to transmitting the SR; and using the second uplink grant to transmit a BSR comprising information on a content size for positioning-specific measurement reporting; wherein the first uplink grant is received in response to the transmission of the BSR.

In a sixth implementation form of the first aspect of the application in combination with the first implementation form of the first aspect of the application, the SR is transmitted using an SR configuration which is dedicated for positioning-specific measurement reporting, or dedicated for general measurement reporting, or dedicated for positioning-specific traffic.

In a seventh implementation form of the first aspect of the application in combination with the first implementation form of the first aspect of the application, the SR is transmitted when the UE has no configured grant for uplink transmission, or when the UE has a configured grant for uplink transmission but the configured grant is too small to carry the first measurement report, or when the UE has a configured grant for uplink transmission but an allocated time of the configured grant is unable to satisfy a latency requirement of positioning-specific measurement reporting.

In an eighth implementation form of the first aspect of the application in combination with the first implementation form of the first aspect of the application, the SR is transmitted using an SR configuration associated with a Logical Channel (LCH) or a Logical Channel Group (LCG) which is specific for positioning-specific measurement reporting, or specific for general measurement reporting, or specific for control-plane signaling, or specific for Non-Access Stratum (NAS) signaling, or specific for positioning-specific traffic.

In a ninth implementation form of the first aspect of the application in combination with the fifth implementation form of the first aspect of the application, the second uplink grant comprises information of time-frequency resources specific for a two-step Random Access Channel (RACH) procedure through which the BSR is transmitted along with a RACH preamble.

In a second aspect of the application, a method executed by a mobile communication network wirelessly serving a UE is provided. The method comprises the following steps: transmitting a location information request to the UE to request positioning-specific measurement reporting; receiving an SR requesting time-frequency radio resources for positioning-specific measurement reporting from the UE; transmitting a first uplink grant or an RRC Reconfiguration message to the UE to activate a first configured grant comprising information of the time-frequency radio resources for positioning-specific measurement reporting; and periodically receiving a respective measurement report from the UE on the time-frequency radio resources for positioning-specific measurement reporting.

In a first implementation form of the second aspect of the application, the transmission of the first uplink grant or the RRC Reconfiguration message is performed in response to the reception of the SR, without triggering a BSR procedure by the UE.

In a second implementation form of the second aspect of the application in combination with the first implementation form of the second aspect of the application, the method further comprises: receiving an RRC message comprising information on a suggested grant size for positioning-specific measurement reporting; wherein the first configured grant is determined based on the suggested grant size for positioning-specific measurement reporting.

In a third implementation form of the second aspect of the application in combination with the second implementation form of the second aspect of the application, the RRC message is a UE Assistance Information message.

In a fourth implementation form of the second aspect of the application in combination with the third implementation form of the second aspect of the application, the UE Assistance Information message is received when a positioning service of the UE is activated or deactivated, or when a serving cell of the UE has changed and the UE has not transmitted any UE Assistance Information message to the new serving cell, or when a period of time has elapsed since a last received UE Assistance Information message, or when the suggested grant size is different from that in the last received UE Assistance Information message.

In a fifth implementation form of the second aspect of the application, the SR is received using an SR configuration which is dedicated for positioning-specific measurement reporting, or dedicated for general measurement reporting, or dedicated for positioning-specific traffic.

In a sixth implementation form of the second aspect of the application, the SR is received when no configured grant for uplink transmission is provided to the UE, or when a configured grant for uplink transmission is provided to the UE but the configured grant is too small to carry the measurement report, or when a configured grant for uplink transmission is provided to the UE but an allocated time of the configured grant is unable to satisfy a latency requirement of positioning-specific measurement reporting.

In a seventh implementation form of the second aspect of the application, the SR is received using an SR configuration associated with a LCH or a LCG which is specific for positioning-specific measurement reporting, or specific for general measurement reporting, or specific for control-plane signaling, or specific for NAS signaling, or specific for positioning-specific traffic.

In an eighth implementation form of the second aspect of the application, the method further comprises: transmitting a second uplink grant for BSR transmission in response to receiving the SR; and receiving a BSR comprising information on a content size for positioning-specific measurement reporting in response to transmitting the second uplink grant; wherein the first uplink grant is transmitted in response to the reception of the BSR.

In a ninth implementation form of the second aspect of the application in combination with the eighth implementation form of the second aspect of the application, the second uplink grant comprises information of time-frequency resources specific for a two-step RACH procedure through which the BSR is received along with a RACH preamble.

Other aspects and features of the present application will become apparent to those with ordinarily skill in the art upon review of the following descriptions of specific embodiments of the methods of latency reduction for positioning-specific measurement reporting.

BRIEF DESCRIPTION OF THE DRAWINGS

The present application can be more fully understood by reading the subsequent detailed description and examples with references made to the accompanying drawings, wherein:

FIG. 7 is a flow chart illustrating the method of latency reduction for positioning-specific measurement reporting in a UE according to an embodiment of the application; and FIG. 8 is a flow chart illustrating the method of latency reduction for positioning-specific measurement reporting in a mobile communication network according to an embodiment of the application.

DETAILED DESCRIPTION OF PREFERRED IMPLEMENTATIONS

The following description is made for the purpose of illustrating the general principles of the application and should not be taken in a limiting sense. It should be understood that the embodiments may be realized in software, hardware, firmware, or any combination thereof. The terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Figure 1:
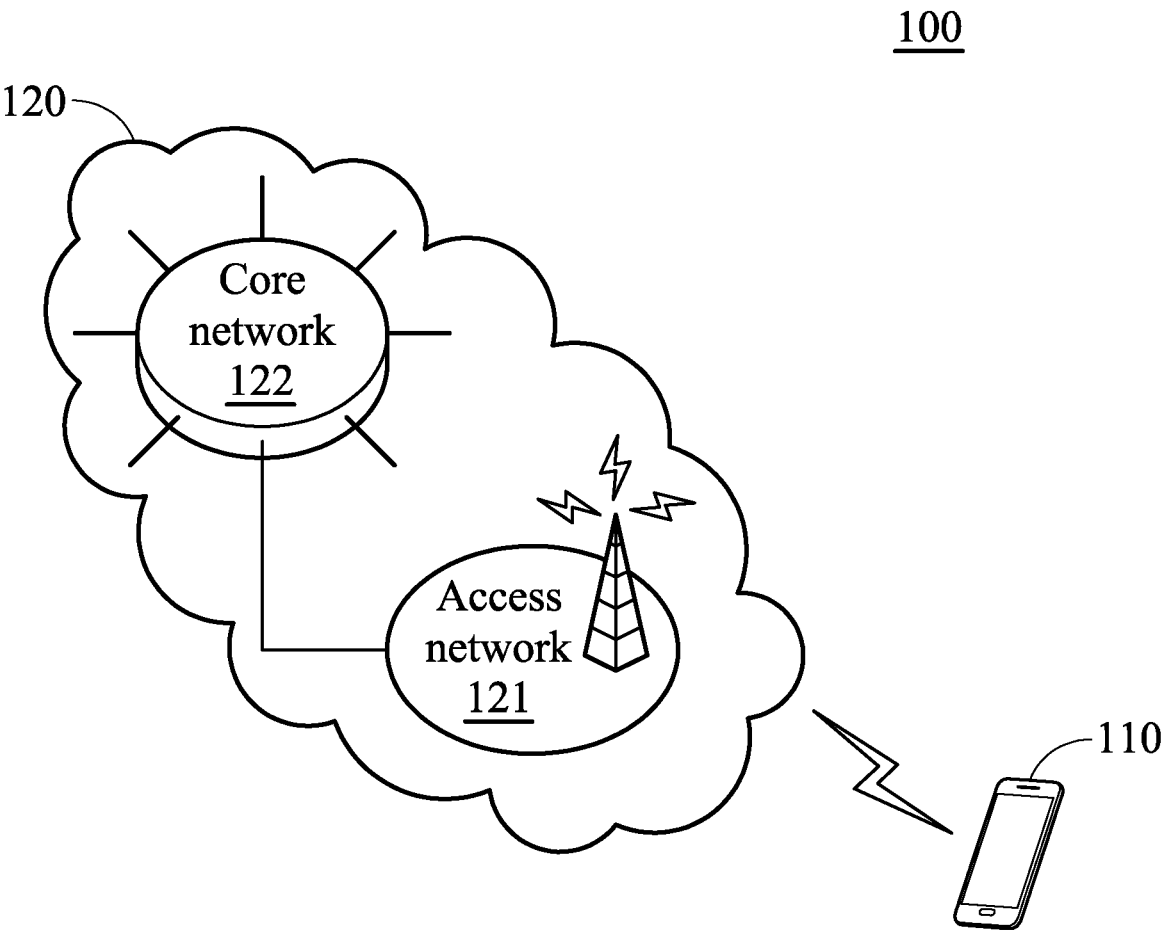
FIG. 1 is a block diagram of a mobile communication environment according to an embodiment of the application.

FIG. 1 is a block diagram of a mobile communication environment according to an embodiment of the application.

As shown in FIG. 1, the mobile communication environment 100 includes a UE 110 and a mobile communication network 120.

The UE 110 may be a feature phone, a smartphone, a panel Personal Computer (PC), a laptop computer, a Machine Type Communication (MTC) device, or any mobile communication device supporting the RAT utilized by the mobile communication network 120. The UE 110 may connect to the mobile communication network 120 to obtain mobile services (e.g., voice and/or data services).

The mobile communication network 120 may include an access network 121 and a core network 122. The access network 121 is responsible for processing radio signals, terminating radio protocols, and connecting the UE 110 with the core network 122, while the core network 122 is responsible for performing mobility management, network-side authentication, and interfaces with public/external networks (e.g., the Internet).

In one embodiment, the mobile communication network 120 is a 5G network (e.g., an NR network), and the access network 121 and the core network 122 may be a Next Generation Radio Access Network (NG-RAN) and a Next Generation Core Network (NG-CN), respectively. The NG-RAN may include one or more gNBs. Each gNB may further include one or more Transmission Reception Points (TRPs), and each gNB or TRP may be referred to as a 5G cellular station. Some gNB functions may be distributed across different TRPs, while others may be centralized, leaving the flexibility and scope of specific deployments to fulfill the requirements for specific cases. The NG-CN may support various network functions, including an Access and Mobility Management Function (AMF), a Location Management Function (LMF), a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on dedicated hardware, or as a software instance running on dedicated hardware, or as a virtualized function instantiated on an appropriate platform, e.g., a cloud infrastructure.

In accordance with one novel aspect, the UE 110 is allowed to indicate, through an SR, to the mobile communication network 120 that there would be periodic measurement reports (e.g., positioning-specific measurement reporting). With this indication, the mobile communication network 120 may determine to activate the use of configured grant for latency reduction, e.g., if latency is a critical concern to the mobile communication network 120. That is, the SR procedure and optionally the BSR procedure only need to be performed once to activate the configured grant for the first measurement report, and subsequent measurement reports may be transmitted using the same configured grant without triggering the SR procedure and/or the BSR procedure.

In accordance with another novel aspect, the mobile communication network 120 may configure a shorter reporting interval for positioning-specific measurement reporting. According to the 3GPP TS 37.355, the existing shortest reporting interval is 1 second while the PRS transmission periodicity is shorter than 1 second. In this regard, the mobile communication network 120 may configure the reporting interval to be the same as the PRS transmission periodicity, so that the measurement reporting will take place immediately after a PRS occasion with a margin time for processing.

Figure 2:
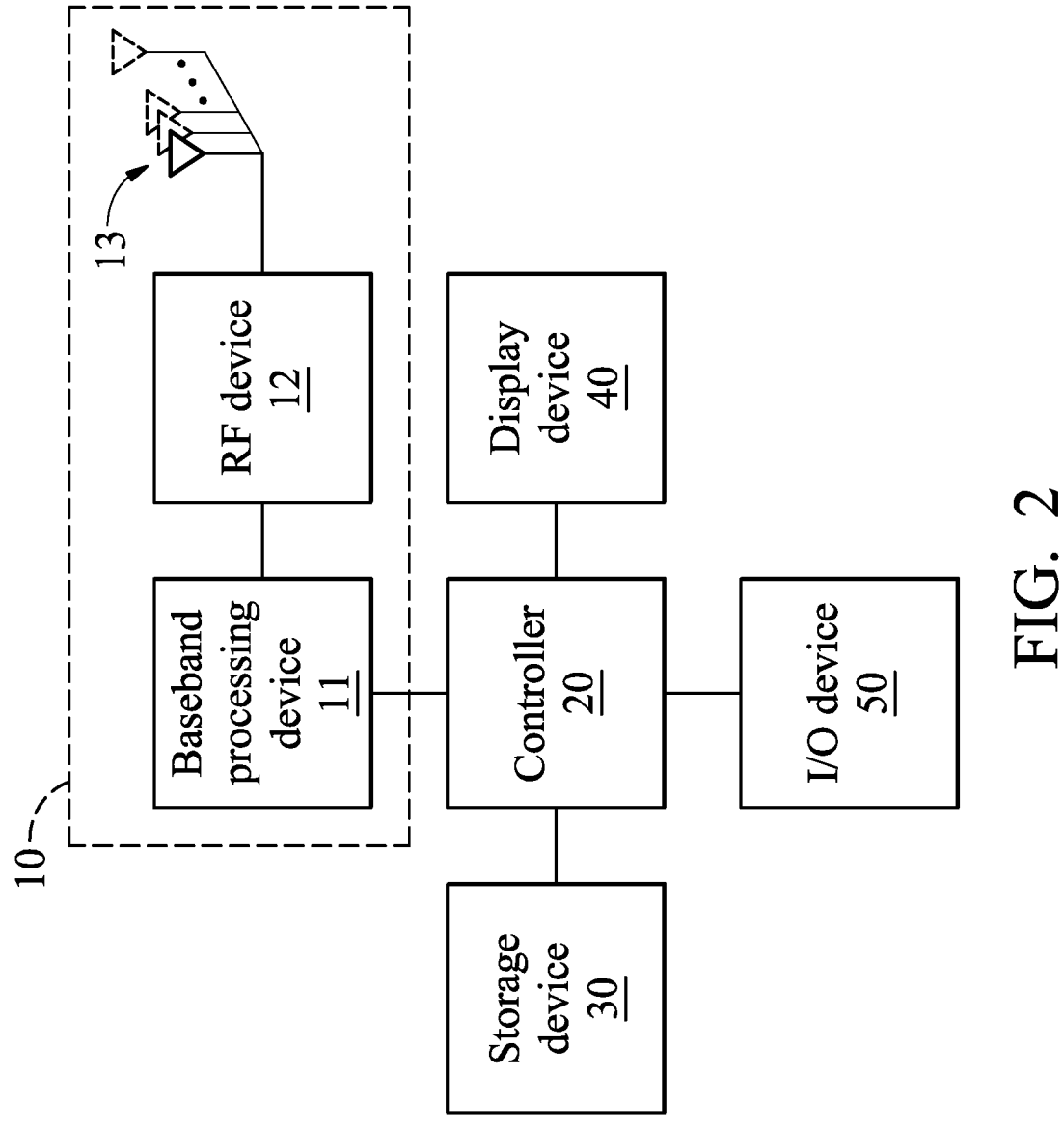
FIG. 2 is a block diagram illustrating a wireless device according to an embodiment of the application.

FIG. 2 is a block diagram illustrating a wireless device according to an embodiment of the application.

The wireless device may refer to a UE (e.g., the UE 110) or a gNB of a mobile communication network (e.g., the mobile communication network 120).

As shown in FIG. 2, the wireless device may include a wireless transceiver 10, a controller 20, a storage device 30, a display device 40, and an Input/Output (I/O) device 50.

The wireless transceiver 10 is configured to perform wireless transmission and reception. Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be any radio frequency (e.g., 30 GHz~300 GHz for mmWave, or 3.3 GHz~4.9 GHz for sub-6) utilized in 5G (e.g., NR) systems, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless transceiving, enabling the storage device for storing and retrieving data, sending a series of frame data (e.g. representing text messages, graphics, images, etc.) to the display device 40, and receiving/outputting signals from/to the I/O device 50.

In particular, the controller 20 coordinates the aforementioned operations of the wireless transceiver 10, the storage device 30, the display device 40, and the I/O device 50 for performing the method of latency reduction for positioning-specific measurement reporting.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory computer-readable storage medium, including a memory (e.g., a FLASH memory or a Non-Volatile Random Access Memory (NVRAM)), a magnetic storage device (e.g., a hard disk or a magnetic tape), or an optical disc, or any combination thereof for storing data, instructions, and/or program code of applications, communication protocols, and/or the method of the present application. For example, the communication protocols may include a 5G NR protocol stack which includes a Non-Access-Stratum (NAS) layer, a Radio Resource Control (RRC) layer, a Packet Data Convergence Protocol/Radio Link Control (PDCP/RLC) layer, a Media Access Control (MAC) layer, and a Physical (PHY) layer. In one example, the method of the present application may be implemented as a part of the communication protocols.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a micro-phone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, the wireless device may include more components, such as a power supply, or a Global Positioning System (GPS) device, wherein the power supply may be a mobile/replaceable battery providing power to all the other components of the wireless device (e.g., a UE), and the GPS device may provide the location information of the wireless device (e.g., a UE) for use of some location-based services or applications. Alternatively, the wireless device may include fewer components. For example, the wireless device (e.g., a UE or a gNB) may not include the display device 40 and/or the I/O device 50.

Figures 3A, 3B:
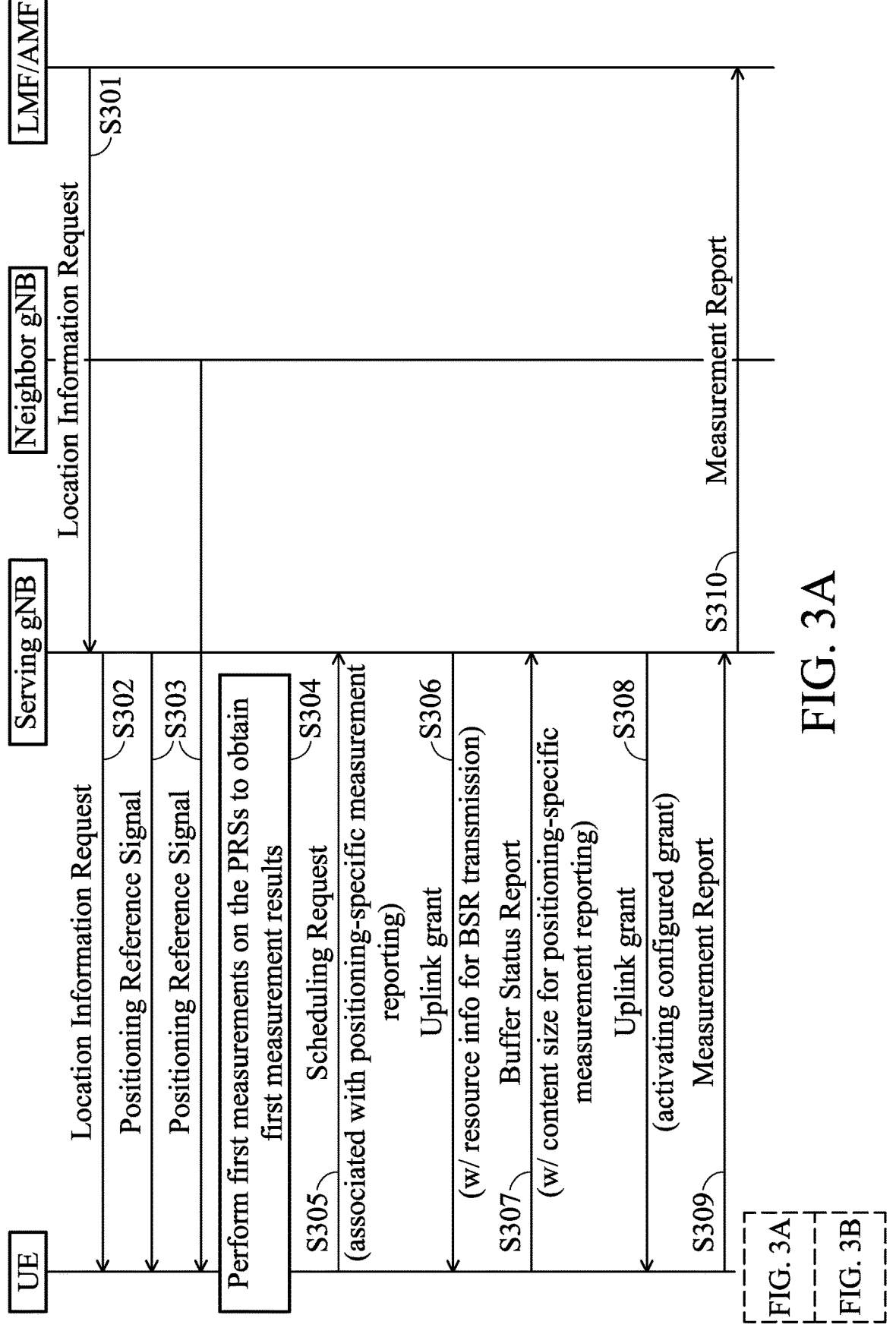
FIGS. 3A and 3B show a message sequence chart illustrating the positioning-specific measurement reporting using type-2 configured grant according to an embodiment of the application.
Figure 3B:
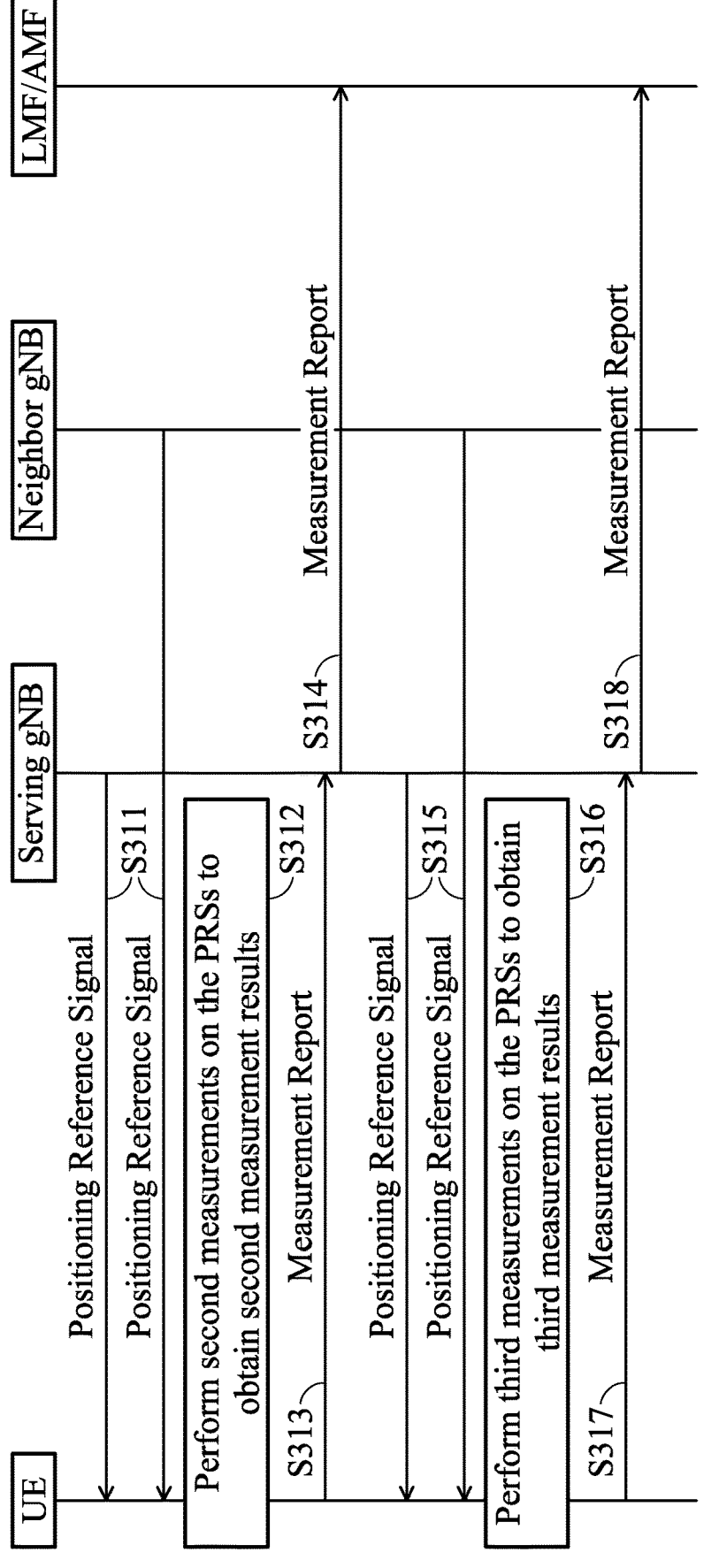

FIGS. 3A and 3B show a message sequence chart illustrating the positioning-specific measurement reporting using type-2 configured grant according to an embodiment of the application.

In step S301, the LMF/AMF of the mobile communication network initiates the location information transfer procedure by transmitting a Location Information Request message to the serving gNB.

In step S302, the serving gNB forwards the Location Information Request message to the UE.

In step S303, the serving gNB and the neighbor gNB transmit Positioning Reference Signals (PRSs) to the UE. Specifically, PRSs are downlink reference signals used to measure Time of Arrival (TOA) for downlink positioning.

In step S304, the UE performs first measurements on the PRSs to obtain first measurement results.

In step S305, the UE transmits an SR to the serving gNB to request time-frequency radio resources for positioning-specific measurement reporting.

In step S306, the serving gNB transmits a first uplink grant to the UE in response to receiving the SR. Specifically, the first uplink grant may include information of time-frequency resources for BSR transmission. In one example, the time-frequency resources for BSR transmission may be specific for a two-step Random Access Channel (RACH) procedure through which the BSR is transmitted along with a RACH preamble, and the time-frequency resources may be configured for the UE to transmit BSR in general, or to transmit BSR for data with critical latency requirement, or to transmit BSR for positioning-specific measurement reporting. In another embodiment, the mobile communication network may configure specific two-step RACH resources for the UE to transmit traffic for "positioning" or "measurement reports for positioning".

In step S307, the UE uses the first uplink grant to transmit a BSR to the serving gNB. Specifically, the BSR may include information on a suggested content size for positioning-specific measurement reporting.

In step S308, the serving gNB transmits a second uplink grant to the UE in response to receiving the BSR. Specifically, the second uplink grant is used to activate the configured grant which includes the information of the time-frequency radio resources for positioning-specific measurement reporting. That is, the configured grant is a type-2 configured grant.

In step S309, the UE uses the configured grant to transmit a measurement report (also called the first measurement report) including the first measurement results to the serving gNB.

In step S310, the serving gNB forwards the Measurement Report to the LMF/AMF.

In step S311, the serving gNB and the neighbor gNB transmit PRS s to the UE.

In step S312, the UE performs second measurements on the PRS s to obtain second measurement results.

In step S313, the UE uses the same configured grant to transmit a measurement report (also called the second measurement report) including the second measurement results to the serving gNB.

In step S314, the serving gNB forwards the Measurement Report to the LMF/AMF.

In step S315, the serving gNB and the neighbor gNB transmit PRS s to the UE.

In step S316, the UE performs third measurements on the PRS s to obtain third measurement results.

In step S317, the UE uses the same configured grant to transmit a measurement report (also called the third measurement report) including the third measurement results to the serving gNB.

In step S318, the serving gNB forwards the Measurement Report to the LMF/AMF.

It should be appreciated that the second and third measurement reports are transmitted without triggering the SR procedure and the BSR procedure, thereby realizing latency reduction for positioning-specific measurement reporting.

Figures 4A, 4B:
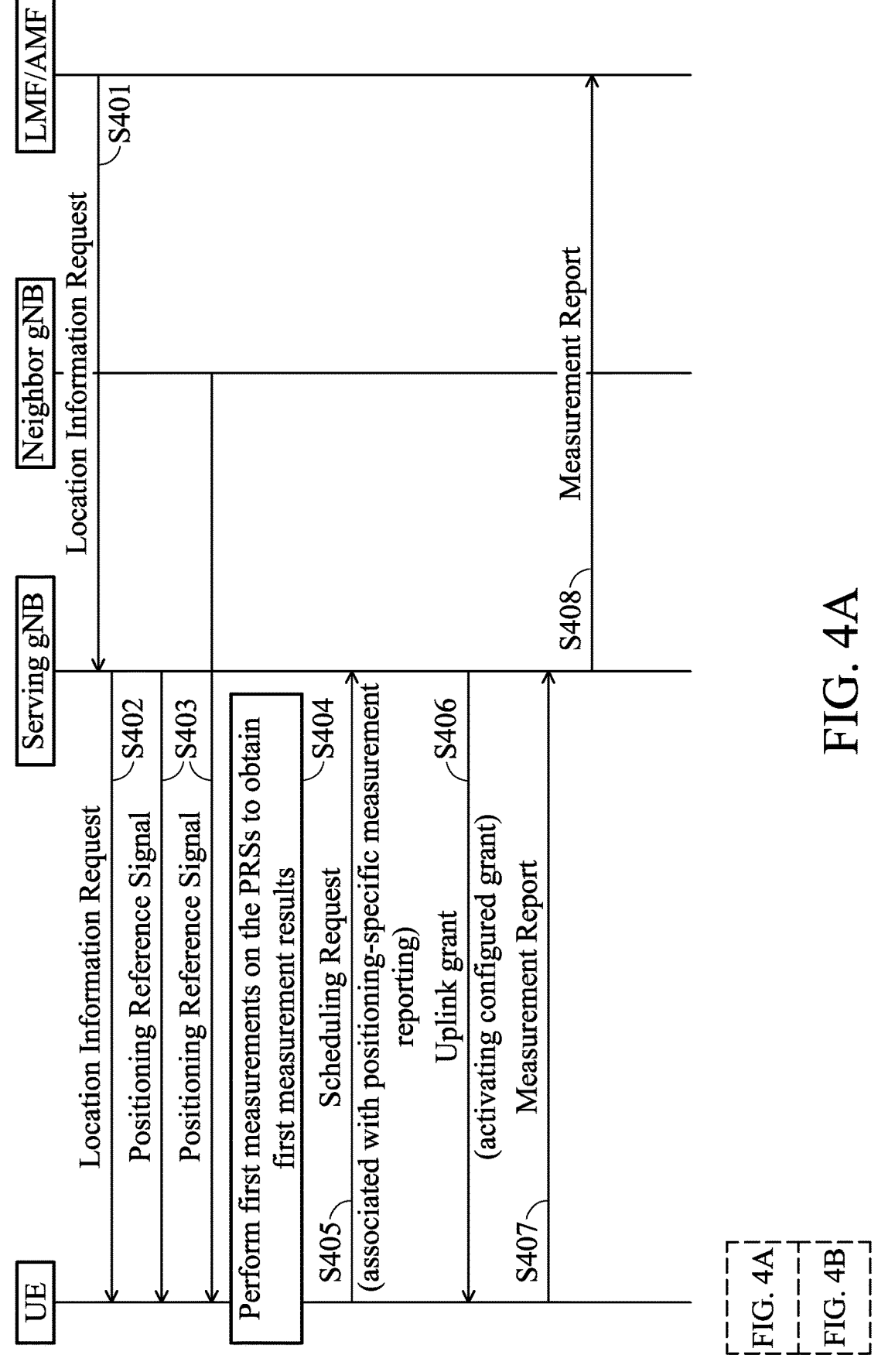
FIGS. 4A and 4B show a message sequence chart illustrating the positioning-specific measurement reporting using type-2 configured grant according to another embodiment of the application.
Figure 4B:
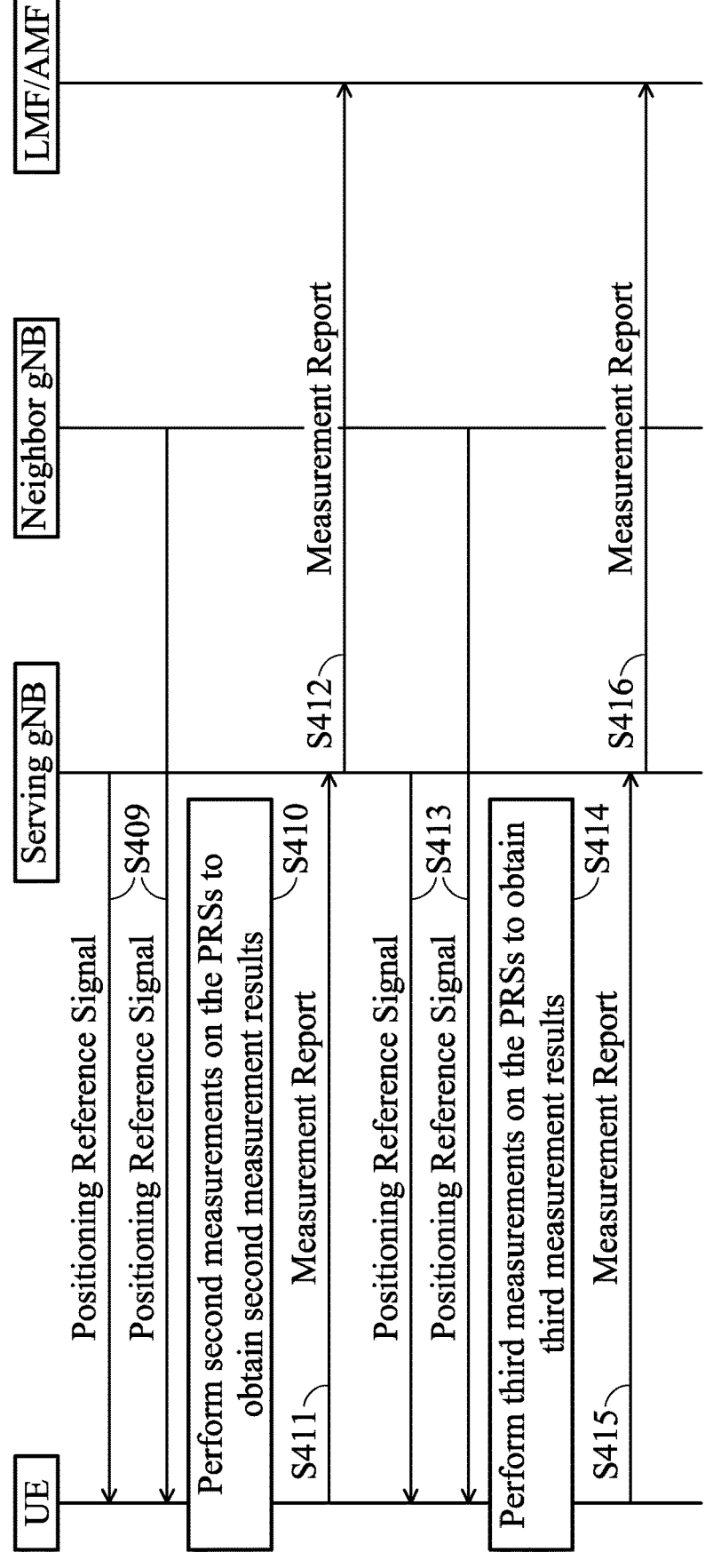

FIGS. 4A and 4B show a message sequence chart illustrating the positioning-specific measurement reporting using type-2 configured grant according to another embodiment of the application.

In step S401, the LMF/AMF of the mobile communication network initiates the location information transfer procedure by transmitting a Location Information Request message to the serving gNB.

In step S402, the serving gNB forwards the Location Information Request message to the UE.

In step S403, the serving gNB and the neighbor gNB transmit PRS s to the UE.

In step S404, the UE performs first measurements on the PRS s to obtain first measurement results.

In step S405, the UE transmits an SR to the serving gNB to request time-frequency radio resources for positioning-specific measurement reporting.

In step S406, the serving gNB transmits an uplink grant to the UE in response to receiving the SR. Specifically, the uplink grant is used to activate the configured grant which includes the information of the time-frequency radio resources for positioning-specific measurement reporting. That is, the configured grant is a type-2 configured grant.

In one embodiment, the UE may suggest the content size for positioning-specific measurement reporting through an RRC message prior to the location information transfer procedure. For example, the UE may transmit a UE Assistance Information message including information on the suggested grant size for positioning-specific measurement reporting. The UE Assistance Information message may be transmitted when the positioning service of the UE is activated or deactivated, or when the serving cell of the UE has changed and the UE has not transmitted any UE Assistance Information message to the new serving cell, or when a period of time has elapsed since the last transmitted UE Assistance Information message, or when the suggested grant size is different from that in the last transmitted UE Assistance Information message.

In step S407, the UE uses the configured grant to transmit a measurement report (also called the first measurement report) including the first measurement results to the serving gNB.

In step S408, the serving gNB forwards the Measurement Report to the LMF/AMF.

In step S409, the serving gNB and the neighbor gNB transmit PRS s to the UE.

In step S410, the UE performs second measurements on the PRS s to obtain second measurement results.

In step S411, the UE uses the same configured grant to transmit a measurement report (also called the second measurement report) including the second measurement results to the serving gNB.

In step S412, the serving gNB forwards the Measurement Report to the LMF/AMF.

In step S413, the serving gNB and the neighbor gNB transmit PRS s to the UE.

In step S414, the UE performs third measurements on the PRS s to obtain third measurement results.

In step S415, the UE uses the same configured grant to transmit a measurement report (also called the third measurement report) including the third measurement results to the serving gNB.

In step S416, the serving gNB forwards the Measurement Report to the LMF/AMF.

Please note that, in this embodiment, the BSR procedure is not triggered after the SR procedure, and thus, the latency incurred by the signaling exchange for the first measurement reporting may be further reduced in contrast to the embodiment of FIGS. 3A~3B.

To further clarify, the SR mentioned in steps S305 and S405 may be transmitted using an SR configuration which is dedicated for positioning-specific measurement reporting, or dedicated for general measurement reporting, or dedicated for positioning-specific traffic. The SR configuration may include information of time-frequency resources and/or request ID for SR transmission associated with positioning-specific measurement reporting. In one embodiment, the SR configuration dedicated for positioning-specific measurement reporting cannot be used for other purposes, such as reporting of data arrival, beam failure recovery, or Listen-Before-Talk (LBT) failure. In another embodiment, the SR configuration dedicated for positioning-specific measurement reporting can also be used for other purposes, i.e., the reporting of data arrival, beam failure recovery, or LBT failure can share the same SR configuration.

In one embodiment, the SR mentioned in steps S305 and S405 may be transmitted when the UE has no configured grant for uplink transmission, or when the UE has a configured grant for uplink transmission but the configured grant is too small to carry the measurement report, or when the UE has a configured grant for uplink transmission but the allocated time of the configured grant is unable to satisfy the latency requirement of positioning-specific measurement reporting.

In one embodiment, the UE may be configured by the mobile communication network with a specific Logical Channel (LCH) or a Logical Channel Group (LCG) to carry the measurement reports for positioning, and the specific LCH/LCG may be associated with an SR configuration. This way, if the UE transmits an SR using the SR configuration associated with the specific LCH/LCG, the mobile communication network knows that this UE has measurement repots for positioning to be transmitted. In a first example, such LCH/LCG may be specific for positioning-specific measurement reporting. In a second example, such LCH/

LCG may be specific for general measurement reporting. In a third example, such LCH/LCG may be specific for control-plane signaling. In a fourth example, such LCH/LCG may be specific for Non-Access Stratum (NAS) signaling. In a fifth example, such LCH/LCG may be specific for positioning-specific traffic.

Figure 5A:
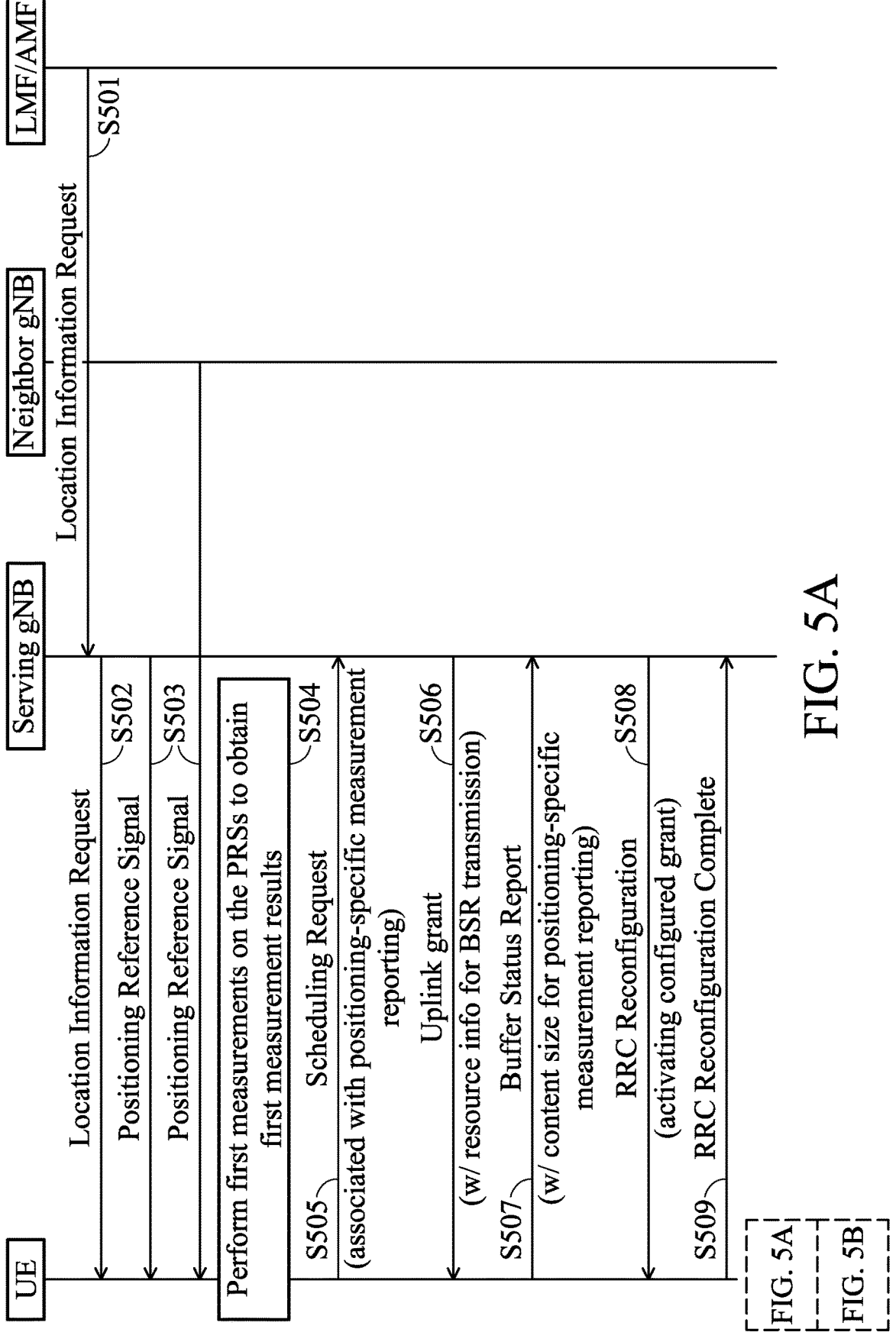
FIGS. 5A and 5B show a message sequence chart illustrating the positioning-specific measurement reporting using type-1 configured grant according to an embodiment of the application.
Figure 5B:
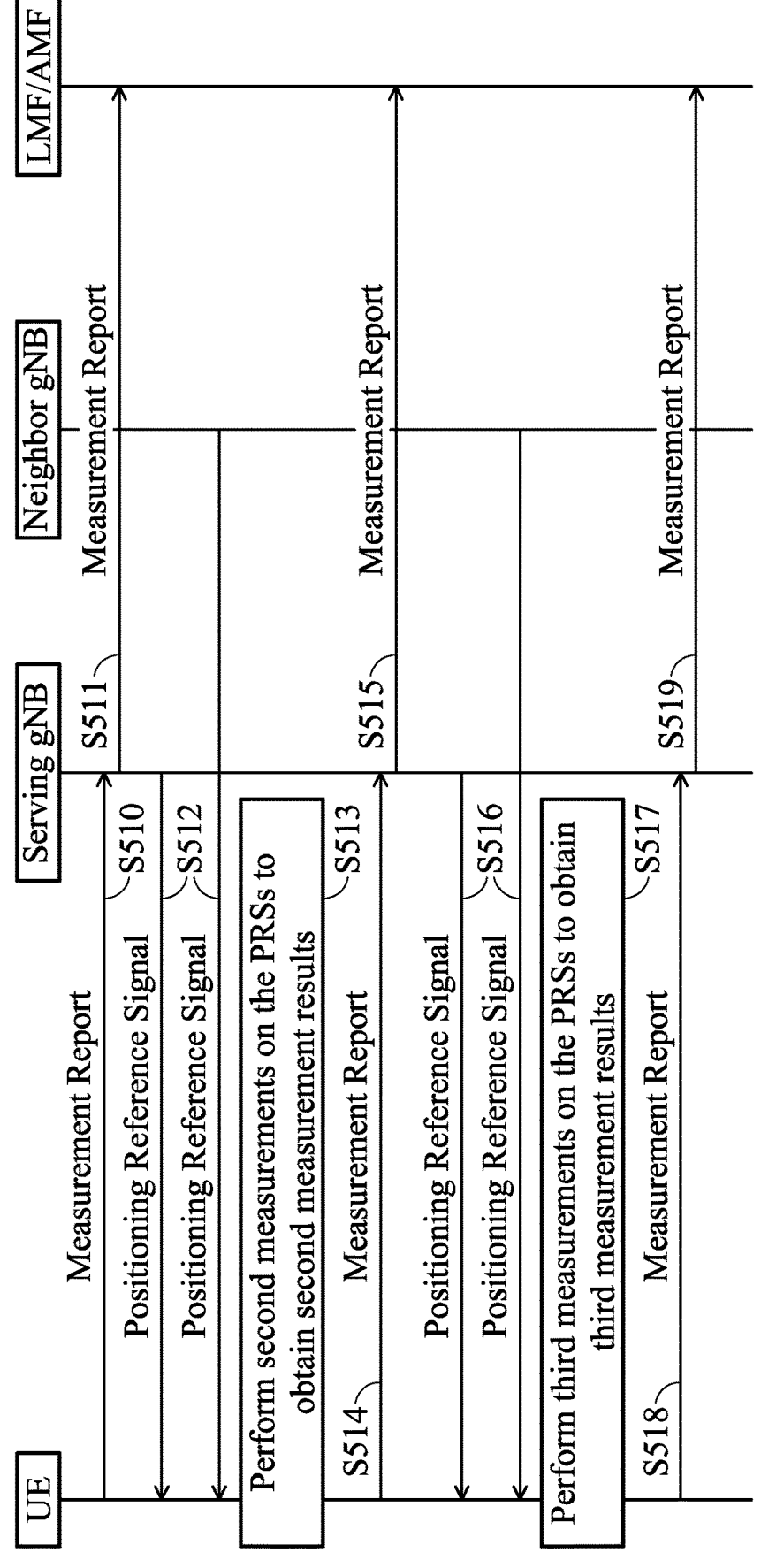

FIGS. 5A and 5B show a message sequence chart illustrating the positioning-specific measurement reporting using type-1 configured grant according to an embodiment of the application.

In this embodiment, steps S501~S507 are the same as steps S301~S307 in FIG. 3A. However, unlike the embodiment of FIGS. 3A~3B, the configured grant in this embodiment is a type-1 configured grant. That is, in step S508, the serving gNB configures a type-1 configured grant for the UE, e.g., via an RRC Reconfiguration message, in response to receiving the BSR.

In step S509, the UE replies to the serving gNB with an RRC Reconfiguration Complete message.

After that, the UE uses the configured grant to transmit measurement reports (including the first, second, and third measurement reports) including the measurement results to the serving gNB. That is, steps S510~S519 are the same as steps S309~S318 in FIGS. 3A~3B.

Figures 6A, 6B:
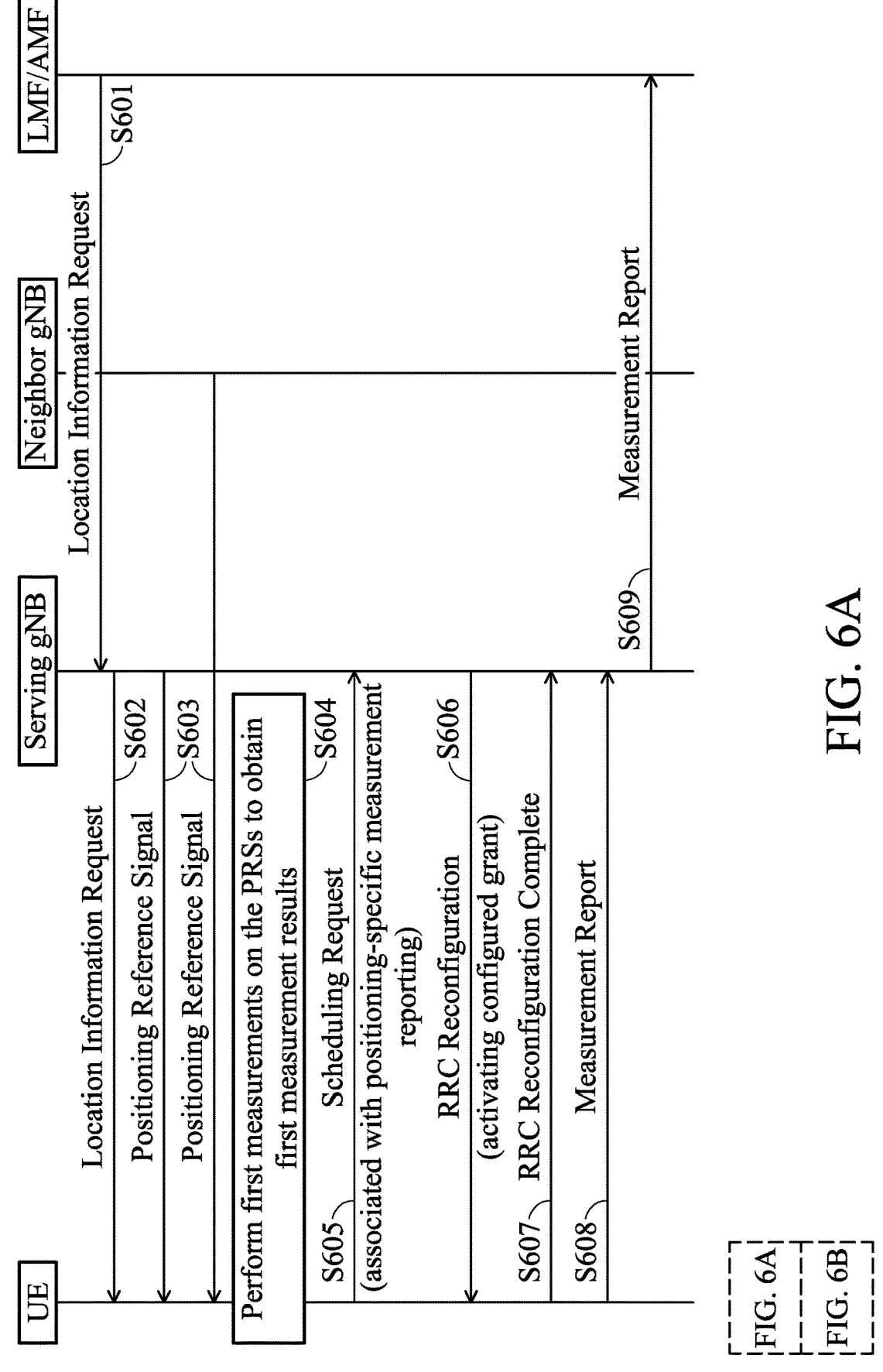
FIGS. 6A and 6B show a message sequence chart illustrating the positioning-specific measurement reporting using type-1 configured grant according to another embodiment of the application.
Figure 6B:
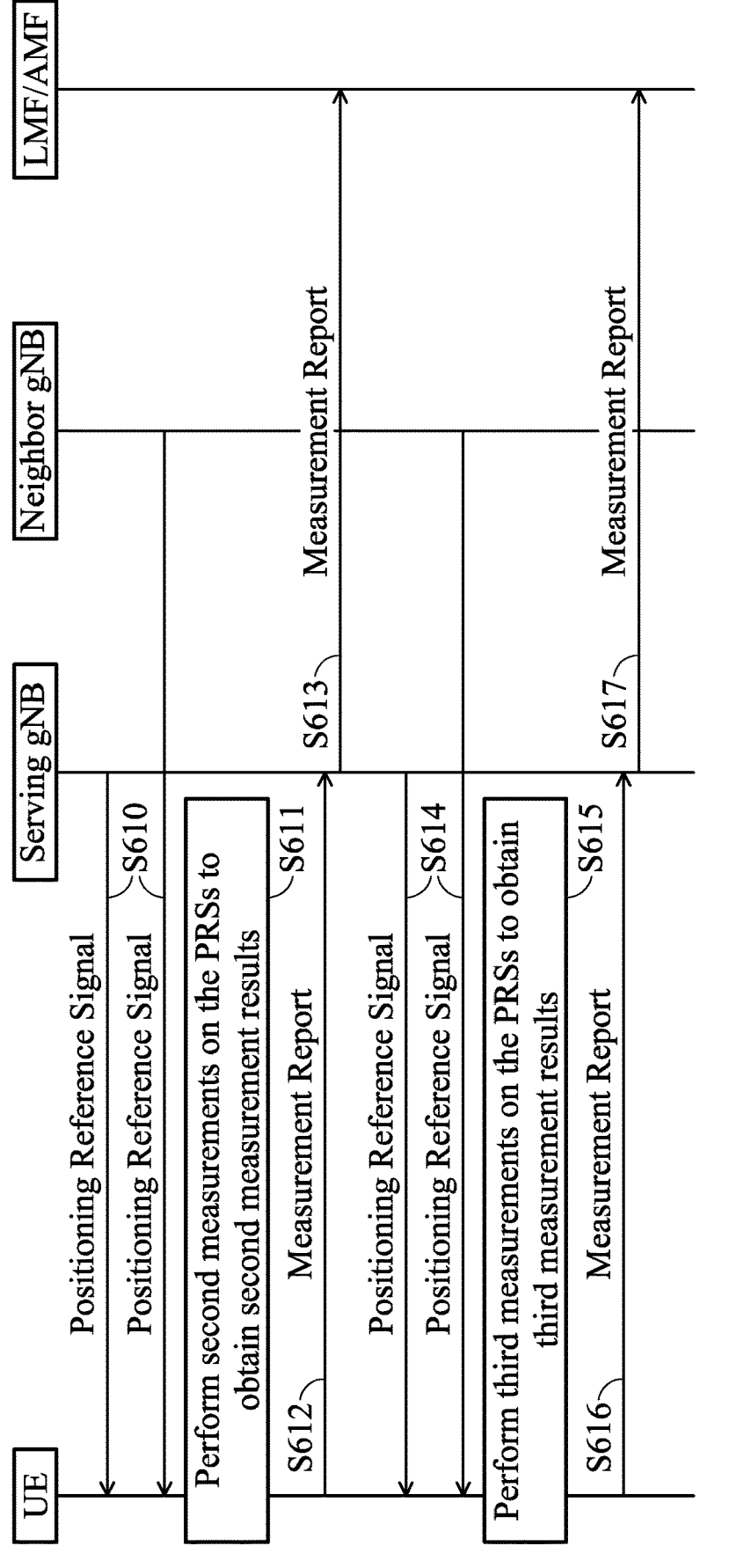

FIGS. 6A and 6B show a message sequence chart illustrating the positioning-specific measurement reporting using type-1 configured grant according to another embodiment of the application.

In this embodiment, steps S601~S605 are the same as steps S401~S405 in FIG. 4A. However, unlike the embodiment of FIGS. 4A~4B, the configured grant in this embodiment is a type-1 configured grant. That is, in step S606, the serving gNB configures a type-1 configured grant for the UE, e.g., via an RRC Reconfiguration message, in response to receiving the SR.

In step S607, the UE replies to the serving gNB with an RRC Reconfiguration Complete message.

After that, the UE uses the configured grant to transmit measurement reports (including the first, second, and third measurement reports) including the measurement results to the serving gNB. That is, steps S608~S617 are the same as steps S407~S416 in the embodiment of FIGS. 4A~4B.

FIG. 7 is a flow chart illustrating the method of latency reduction for positioning-specific measurement reporting in a UE according to an embodiment of the application.

In this embodiment, the method of latency reduction for positioning-specific measurement reporting is executed by a UE communicatively connected to a mobile communication network.

In step S710, the UE performs first measurements on PRSs to obtain first measurement results in response to receiving a location information request from the mobile communication network.

In step S720, the UE uses a first configured grant to transmit a first measurement report comprising the first measurement results to the mobile communication network.

In step S730, the UE performs second measurements on PRSs to obtain second measurement results in response to the same location information request.

In step S740, the UE uses the first configured grant to transmit a second measurement report comprising the second measurement results to the mobile communication network, without triggering an SR procedure or a BSR procedure.

FIG. 8 is a flow chart illustrating the method of latency reduction for positioning-specific measurement reporting in a mobile communication network according to an embodiment of the application.

In this embodiment, the method of latency reduction for positioning-specific measurement reporting is executed by a mobile communication network wirelessly serving a UE.

In step S810, the mobile communication network transmits a location information request to the UE to request positioning-specific measurement reporting.

In step S820, the mobile communication network receives an SR requesting time-frequency radio resources for positioning-specific measurement reporting from the UE.

In step S830, the mobile communication network transmits a first uplink grant or an RRC Reconfiguration message to the UE to activate a first configured grant comprising information of the time-frequency radio resources for positioning-specific measurement reporting.

In step S840, the mobile communication network periodically receives a respective measurement report from the UE on the time-frequency radio resources for positioning-specific measurement reporting.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention claimed is:

1. A method, executed by a User Equipment (UE) communicatively connected to a mobile communication network, the method comprising: performing first measurements on Positioning Reference Signals (PRSs) to obtain first measurement results in response to receiving a location information request from the mobile communication network; using a first configured grant to transmit a first measurement report comprising the first measurement results to the mobile communication network; performing second measurements on PRSs to obtain second measurement results in response to the location information request; using the first configured grant to transmit a second measurement report comprising the second measurement results to the mobile communication network, without triggering a Scheduling Request (SR) procedure or a Buffer Status Report (BSR) procedure;

transmitting a Scheduling Request (SR) to the mobile communication network to request time-frequency radio resources for positioning-specific measurement reporting receiving a first uplink grant or a Radio Resource Control (RRC) Reconfiguration message activating the first configured grant comprising information of the time-frequency radio resources for positioning-specific measurement reporting; receiving a second uplink grant for BSR transmission in response to transmitting the SR; and using the second uplink grant to transmit a BSR comprising information on a content size for positioning-specific measurement reporting; wherein the first uplink grant is received in response to the transmission of the BSR.

2. The method as claimed in claim 1, wherein the reception of the first uplink grant or the RRC Reconfiguration message is performed in response to the transmission of the SR, without triggering the BSR procedure, and the method further comprises: prior to receiving the location information request, transmitting an RRC message comprising information on a suggested grant size for positioning-specific measurement reporting.

3. The method as claimed in claim 2, wherein the RRC message is a UE Assistance Information message.

4. The method as claimed in claim 3, wherein the UE Assistance Information message is transmitted when a positioning service of the UE is activated or deactivated, or when a serving cell of the UE has changed and the UE has not transmitted any UE Assistance Information message to the new serving cell, or when a period of time has elapsed since a last transmitted UE Assistance Information message, or when the suggested grant size is different from that in the last transmitted UE Assistance Information message.

5. The method as claimed in claim 1, wherein the SR is transmitted using an SR configuration which is dedicated for positioning-specific measurement reporting, or dedicated for general measurement reporting, or dedicated for positioning-specific traffic.

6. The method as claimed in claim 1, wherein the SR is transmitted when the UE has no configured grant for uplink transmission, or when the UE has a configured grant for uplink transmission but the configured grant is too small to carry the first measurement report, or when the UE has a configured grant for uplink transmission but an allocated time of the configured grant is unable to satisfy a latency requirement of positioning-specific measurement reporting.

7. The method as claimed in claim 1, wherein the SR is transmitted using an SR configuration associated with a Logical Channel (LCH) or a Logical Channel Group (LCG) which is specific for positioning-specific measurement reporting, or specific for general measurement reporting, or specific for control-plane signaling, or specific for Non-Access Stratum (NAS) signaling, or specific for positioning-specific traffic.

8. The method as claimed in claim 1, wherein the second uplink grant comprises information of time-frequency resources specific for a two-step Random Access Channel (RACH) procedure through which the BSR is transmitted along with a RACH preamble.

9. A method, executed by a mobile communication network wirelessly serving a User Equipment (UE), the method comprising: transmitting a location information request to the UE to request positioning-specific measurement reporting; receiving a Scheduling Request (SR) requesting time-frequency radio resources for positioning-specific measurement reporting from the UE; transmitting a first uplink grant or a Radio Resource Control (RRC) Reconfiguration message to the UE to activate a first configured grant comprising information of the time-frequency radio resources for positioning-specific measurement reporting; and periodically receiving a respective measurement report from the UE on the time-frequency radio resources for positioning-specific measurement reporting.

10. The method as claimed in claim 9, wherein the transmission of the first uplink grant or the RRC Reconfiguration message is performed in response to the reception of the SR, without triggering a Buffer Status Report (BSR) procedure by the UE.

11. The method as claimed in claim 10, further comprising: receiving an RRC message comprising information on a suggested grant size for positioning-specific measurement reporting; wherein the first configured grant is determined based on the suggested grant size for positioning-specific measurement reporting.

12. The method as claimed in claim 11, wherein the RRC message is a UE Assistance Information message.

13. The method as claimed in claim 12, wherein the UE Assistance Information message is received when a positioning service of the UE is activated or deactivated, or when a serving cell of the UE has changed and the UE has not transmitted any UE Assistance Information message to the new serving cell, or when a period of time has elapsed since a last received IE Assistance Information message, or when the suggested grant size is different from that in the last received IE Assistance Information message.

14. The method as claimed in claim 9, wherein the SR is received using an SR configuration which is dedicated for positioning-specific measurement reporting, or dedicated for general measurement reporting, or dedicated for positioning-specific traffic.

15. The method as claimed in claim 9, wherein the SR is received when no configured grant for uplink transmission is provided to the IE, or when a configured grant for uplink transmission is provided to the IE but the configured grant is too small to carry the measurement report, or when a configured grant for uplink transmission is provided to the IE but an allocated time of the configured grant is unable to satisfy a latency requirement of positioning-specific measurement reporting.

16. The method as claimed in claim 9, wherein the SR is received using an SR configuration associated with a Logical Channel (LCH) or a Logical Channel Group (LCG) which is specific for positioning-specific measurement reporting, or specific for general measurement reporting, or specific for control-plane signaling, or specific for Non-Access Stratum (NAS) signaling, or specific for positioning-specific traffic.

17. The method as claimed in claim 9, further comprising: transmitting a second uplink grant for BSR transmission in response to receiving the SR; and receiving a BSR comprising information on a content size for positioning-specific measurement reporting in response to transmitting the second uplink grant; wherein the first uplink grant is transmitted in response to the reception of the BSR.

18. The method as claimed in claim 17, wherein the second uplink grant comprises information of time-frequency resources specific for a two-step Random Access Channel (RACH) procedure through which the BSR is received along with a RACH preamble.

* * * * *